(12) United States Patent
Trost

(10) Patent No.: US 9,350,831 B2
(45) Date of Patent: May 24, 2016

(54) SYSTEM AND METHOD FOR ENABLING A DUAL-WIRE PROTOCOL

(71) Applicant: Broadcom Corporation, Irvine, CA (US)

(72) Inventor: Theodore Albert Trost, San Diego, CA (US)

(73) Assignee: BROADCOM CORPORATION, Irvine, CA (US)

( * ) Notice: Subject to any disclaimer, the term of this patent is extended or adjusted under 35 U.S.C. 154(b) by 107 days.

(21) Appl. No.: 14/333,575

(22) Filed: Jul. 17, 2014

(65) Prior Publication Data

US 2015/0319273 A1  Nov. 5, 2015

Related U.S. Application Data

(60) Provisional application No. 61/986,203, filed on Apr. 30, 2014.

(51) Int. Cl.
*H04M 1/02* (2006.01)
*H04B 5/00* (2006.01)

(52) U.S. Cl.
CPC ........... *H04M 1/0202* (2013.01); *H04B 5/0031* (2013.01)

(58) Field of Classification Search
CPC .......................... H04M 1/0202; H04B 5/0031
See application file for complete search history.

(56) References Cited

U.S. PATENT DOCUMENTS

| 8,655,273 | B2 | 2/2014 | Huomo |
| 2012/0030388 | A1* | 2/2012 | Bas ..................... G06F 13/4027 710/106 |

\* cited by examiner

*Primary Examiner* — Idriss N Alrobaye
*Assistant Examiner* — Ronald Modo
(74) *Attorney, Agent, or Firm* — Foley & Lardner LLP; Christopher J. McKenna; Helen H. Zhang

(57) ABSTRACT

A system and method for enabling a dual-wire protocol (DWP). A low-power alternative to the single wire protocol (SWP) is provided that uses an extra wire. DWP can reduce the NFC chip's current requirement to almost zero, while enabling higher transmission rates.

16 Claims, 3 Drawing Sheets

SYSTEM AND METHOD FOR ENABLING A DUAL-WIRE PROTOCOL

This application claims the benefit of and priority to provisional application No. 61/986,203, filed Apr. 30, 2014, which is incorporated herein by reference in its entirety.

BACKGROUND

1. Field

The present disclosure relates generally to digital communications and, more particularly, to a system and method for enabling a dual-wire protocol.

2. Introduction

Near field communication (NFC) is a set of standards for mobile devices that establish close-proximity wireless communication. It is anticipated that NFC will enable various mobile applications including contactless transactions, data exchange, and simplified setup of more complex communications. NFC can also be used between an NFC device and an unpowered NFC chip.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Figure 1:
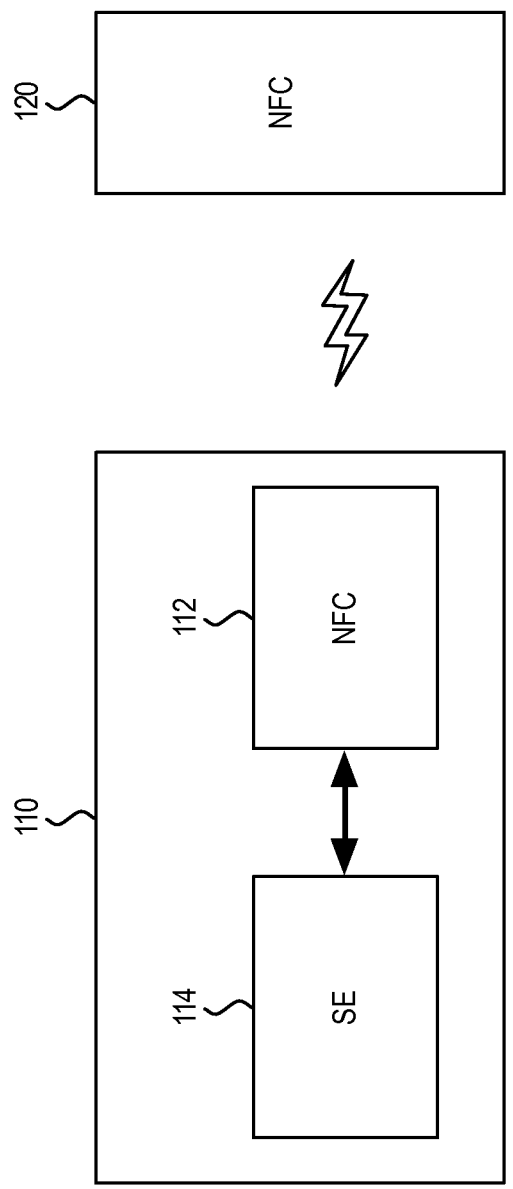
FIG. 1 illustrates an example embodiment of an NFC system.

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

The Single Wire Protocol (SWP) is an existing specification for a single-wire connection between a Secure Element (SE) chip and an NFC chip. In one example, the NFC chip and the SE chip are included in a mobile device (e.g., mobile phone).

In SWP, the NFC chip is configured to transmit information onto the wire by driving voltages 0 V and 1.8V, while the SE chip transmits information onto the wire by sinking 0 mA or 1 mA current, whenever there is 1.8V on the wire. Unfortunately, 1 mA is a significant portion of the NFC chip's current budget in low-power mode. In addition, SWP transmission rates are limited to only 1.7 Mbps.

As will be described in greater detail below, a low-power alternative to SWP is provided that uses an extra wire. This extra wire produces a two-wire protocol that is referred to herein as a Dual Wire Protocol (DWP). At the expense of one extra wire, DWP can reduce the NFC chip's current requirement to almost zero, while enabling higher transmission rates (e.g., quadruple or higher) as compared to SWP.

In one embodiment, a DWP device is provided that incorporates a first physical layer device (PHY) that is configured to communicate bi-directionally with a second PHY via SWP. As noted, communication in a first direction over the single wire using SWP is via a voltage signal while communication in a second direction over the single wire using SWP is via a current signal. The DWP device also includes a digital communication block that is configured to transmit and to receive communication signals. When operating in an SWP mode, the digital communication block would transmit and receive over the single wire via the PHY.

To facilitate the selective operation in either the SWP or DWP modes, the DWP device includes a selector module that is configured to couple the first PHY to an interface pin of the DWP device when the DWP device operates in the SWP mode for detection by the first PHY of a current signal from a second device, and to couple the digital communication block to the interface pin of the DWP device when the device operates in a DWP mode for detection by the digital communication block of a voltage signal from the second device.

In one embodiment, a process of a DWP device is provided, which includes determining, by a DWP device, whether to communicate with a second device using either SWP where communication in a first direction over a single wire is via a voltage signal and communication in a second direction over the single wire is via a current signal or DWP where communication over two wires is via voltage signals. Based on the determined communication mode, the process would then proceed to configure a selector module within the DWP device based on the determination. In one embodiment, the selector module is configured to couple a PHY to an interface pin of the DWP device when the device operates using SWP for detection by the PHY of a current signal from a second device, and is configured to couple the digital communication block to the interface pin of the DWP device when the DWP device operates using DWP for detection by the digital communication block of a voltage signal from the second device.

Prior to describing the details of a configurable DWP device that can selectively operate in an SWP or a DWP mode, reference is made first to FIG. 1, which illustrates an example embodiment of an NFC system. As illustrated, the NFC system includes mobile device 110 and NFC device 120 (e.g., a reader device). In this high-level illustration, mobile device 110 further includes NFC element 112 and SE 114. Communication between NFC element 112 and SE 114 can be enabled using SWP or DWP, depending on the particular communication protocols supported by NFC element 112 and SE 114.

In general, an SE chip can represent a tamper-resistant chip that facilitates the secure storage of confidential information. For example, an SE chip can be configured to store confidential payment information and other sensitive credential information. SE chips can be applied to various applications, and can be embodied in various form factors (e.g., SmartCard, UICC(SIM), eSE, micro SD, or any other secure storage element).

In general, an SE chip can represent a computing environment on a single chip, complete with a secure microcontroller, ROM, EEPROM, RAM and I/O port. The SE chip can also include a cryptographic co-processor that is configured to implement common algorithms such as DES, AES and RSA. SE chips are certified for tamper-resistant use, making it difficult to extract data by disassembling or analyzing the SE chip. SE chips can also be pre-programmed with a multi-application OS that takes advantage of the hardware's memory protection features to ensure that each application's data is only available to itself. Application installation and (optionally) access is controlled by requiring the use of cryptographic keys for each operation.

Here, it should be noted that the extensive qualification and certification process required of SE chips can lead to significant delays in the adoption of new communication protocols by particular SE chips. As such, the pace at which next-generation technologies are adopted by the SE chips relative to NFC chips will differ substantially. It is recognized by the present disclosure that the adoption of a next-generation DWP by NFC chips can be in tandem with backwards compatibility with SE chips that only support previous-generation SWP technology.

Figure 2:
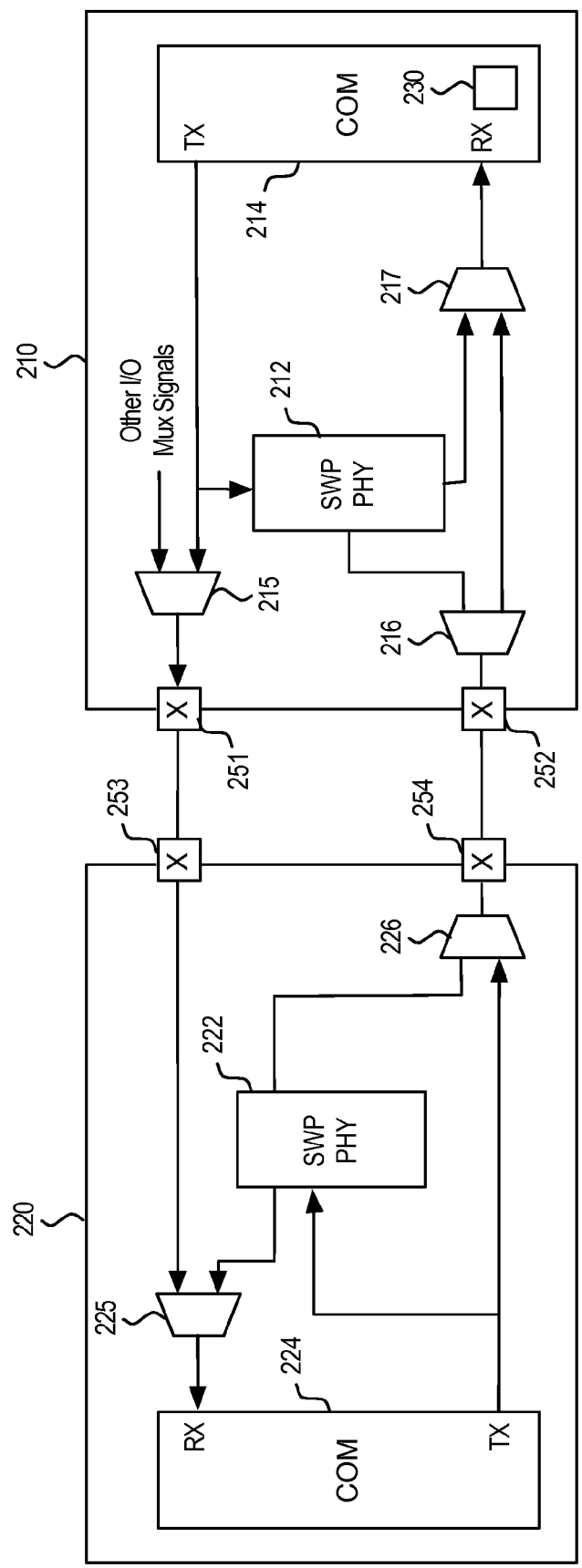
FIG. 2 illustrates and example embodiment of communication between an NFC controller chip and a secure element chip.

FIG. 2 illustrates an example embodiment of communication between NFC chip 210 and SE chip 220, both of which can be configured to operate in either an SWP or a DWP mode. In facilitating support for SWP and DWP modes, both NFC chip 210 and SE chip 220 can be based on encode/decode hardware that is already used for the existing SWP. This encode/decode hardware is illustrated as SWP PHY 214 in NFCC chip 210 and SWP PHY 222 in SE chip 220.

As would be appreciated, SWP PHY 212 in NFC chip 210 can be configured to drive voltages of 0V and 1.8V when transmitting, while also including a current sensor that would enable SWP PHY 212 to detect when SE chip 220 is sinking 1 mA current on the single wire. Similarly, SWP PHY 222 in SE chip 220 can include resistors and transistors that are connected in a series/parallel configuration that can be configured to draw current on the single wire when 1.8V is present on the single wire. The number of transistors turned on can be changed to adjust the resistance and current draw of the circuit. As would be appreciated, the particular implementation details of SWP PHY 212 in NFC chip 210 and SWP PHY 222 in SE chip 220 in supporting SWP would not limit the scope of the present disclosure.

Support for both the SWP and DWP modes can be enabled through one or more selector modules (e.g., multiplexers) that configure NFC chip 210 and SE chip 220. Consider first the configuration into the SWP mode. For NFC chip 210, selector module 216 would be configured to couple SWP PHY 212 in NFC chip 210 to interface pin 252, while selector module 217 would couple SWP PHY 212 in NFC chip 210 to digital communication block 214 of NFC chip 210. Selector module 215 in NFC chip 210 would not couple digital communication block 214 to interface pin 251. Rather, digital communication block 214 would be coupled directly to SWP PHY 212. Here, it should be noted that selector module 215 can also be used to send other I/O mux signals to interface pin 251. For SE chip 220, selector module 226 would be configured to couple SWP PHY 222 in SE chip 220 to interface pin 254, while selector module 225 would be configured to couple SWP PHY 222 in SE chip 220 to digital communication block 224.

In this configuration, SWP PHY 212 in NFC chip 210 and SWP PHY 222 in SE chip 220 would be enabled to perform transmit encoding and receive decoding on behalf of their respective digital communication blocks 214 and 224, respectively. Communication between SWP PHY 212 in NFC chip 210 and SWP PHY 222 in SE chip 220 would then be via SWP over a single wire that connects interface pin 252 of NFC chip 210 to interface pin 254 of SE chip 220. As would be appreciated, this configuration of NFC chip 210 and SE chip 220 would represent the connectivity of an NFC chip and SE chip that only supported SWP.

For the DWP mode, the SE chip's transmit signal is a voltage rather than a current. Additionally, the signal is transmitted on a separate wire. Thus, there are now two wires that carry separate voltage transmit signals. In the DWP mode, digital communication block 214 in NFC chip 210 and digital communication block 224 in SE chip 220 would retain the same base functionality. Since the SE chip is designed to transmit voltage signals during the DWP mode, digital communication block 214 in NFC chip 210 can be connected directly to digital communication block 224 in SE chip 220.

More specifically, for NFC chip 210, selector module 215 would be configured to couple digital communication block 214 to interface pin 251, while selector module 216 and selector module 217 would be configured to couple digital communication block 214 to interface pin 252. SWP PHY 212 would be de-coupled from interface pin 252. For SE chip 220, selector module 225 would be configured to couple digital communication block 224 to interface pin 253, while selector module 226 would be configured to couple digital communication block 224 to interface pin 254. SWP PHY 222 would be de-coupled from interface pin 254.

In this DWP configuration, transmission from NFC chip 210 to SE chip 220 would be based on a voltage signal on the first wire connecting interface pin 251 of NFC chip 210 to interface pin 253 of SE chip 220, while transmission from SE chip 220 to NFC chip 210 would be based on a voltage signal on the second wire connecting interface pin 254 of SE chip 220 to interface pin 252 of NFC chip 210. As DWP is based on transmission using voltage signals, faster transmission rates can be achieved using faster clocks driving existing SWP logic.

As noted, an SE chip may or may not support DWP. As such, the NFC chip may not know whether the SE chip with which it is communicating is an SWP or DWP device. One of the features of the NFC chip is that it can support a detection procedure to identify the particular mode in which it should operate. In one embodiment, the detection procedure is controlled by control element 230 in digital communication block 214.

In one embodiment, the detection procedure assumes that the NFC chip is communicating with an SWP device. When the NFC chip drives voltage onto the SWP wire, the NFC chip uses it's own SWP PHY to listen for one of two current levels. For example, a first current level of 1 mA would indicate an SWP mode, while a second, lower current level (e.g., 0.25 mA) would indicate a DWP mode.

Consider a scenario where the SWP PHY in the SE chip includes two series resistor/transistor sections in a parallel configuration, where a first section produces a resistor of value 3R, while the second section produces a resistor of value 1R. With this proportion of resistor values, the SE chip can be configured to turn on both sections or only the first section. To signal a DWP mode, both sections can be turned on, such that the equivalent resistance of both fingers is 0.75R. To signal a SWP mode, on the other hand, only the first section can be turned on, such that only the 3R resistance of the first section is presented. As the indication of the SWP mode presents four times as much resistance as compared to the indication of the DWP mode, the current drawn would be four times as much in the indication of the SWP mode as compared to the indication of the DWP mode. Where the value of R is sized appropriately, the indication of the SWP mode can draw 1 mA, while the indication of the DWP mode can draw 0.25 mA.

Once NFC chip 210 has recognized the lower current level (e.g., 0.25 mA), NFC chip 210 can begin transmitting via interface pin 251, rather than through SWP PHY 212. SE chip 220, listening on interface pin 253, would recognize a signal from NFC chip 210 and would switch selector module 225 to receive from interface pin 253 rather than SWP PHY 222. Conversely, SE chip 220 would switch selector module 226 to enable the transmission of voltage signals directly onto interface pin 254, rather than through SWP PHY 222. NFC chip 210 would then switch selector modules 216 and 217 to enable receiving of voltage signals on interface pin 252, rather than via SWP PHY 212.

In another embodiment, the NFC chip can detect whether or not the SE chip is a DWP device through a dedicated input pin that indicates an SWP mode or a DWP mode. This dedicated input pin can be driven by the SE chip, statically driven high or low on the PCB board, or left unconnected. If the dedicated input pin is left unconnected, a pull resistor internal to the NFC chip can be used to indicate the default selection.

Figure 3:
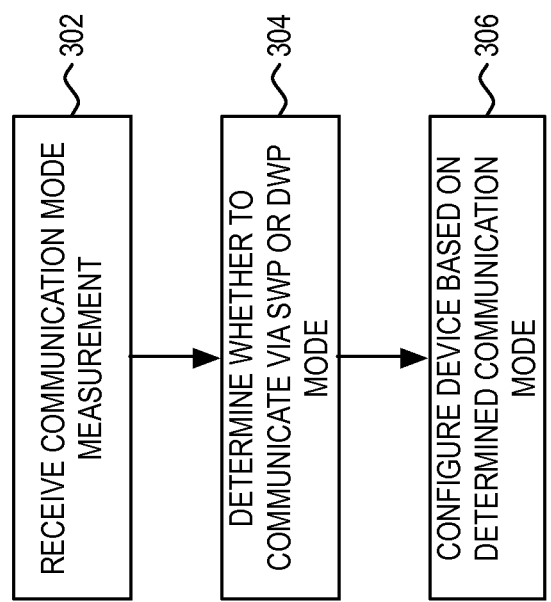
FIG. 3 illustrates a flowchart of an example process.

Having described an embodiment of an NFC chip and SE chip that can support both SWP and DWP, reference is now made to FIG. 3, which illustrates a flowchart of an example process. As illustrated, the process can begin at step 302 where a communication mode measurement is received. In various embodiments, the communication mode measurement would enable the NFC chip and/or the SE chip to assess which communication mode should be used. As noted above, various mechanisms can be used to derive a communication mode decision process. In general, the communication mode measurement can be part of an active configuration process between the NFC chip and SE chip, can be based on pre-set input pin settings, can be based on pre-set register settings, or any other mechanism that enables the NFC chip and/or SE chip to determine whether an SWP mode or DWP mode should be used. In general, the particular configuration mechanism used would be implementation dependent and would not limit the scope of the present disclosure.

After the communication mode measurement is completed, the process would then continue to step 304 where a determination of a particular communication mode is made based on the communication mode measurement. In one embodiment, the determination can be controlled by a control element incorporated within a digital communication block within the NFC chip. As would be appreciated, the particular mechanism by which the determination is made would be dependent on the particular type of communication mode measurement that is used as an input to the determination process.

Next, at step 308, the device is configured based on the determined communication mode. As described in the example embodiment above, the configuration can include the configuration of one or more selector modules (e.g., multiplexers) that are used to configure the connectivity within the device. This particular example mechanism of configuration is not intended to be limiting. In general, any mechanism that enables a change in configuration to support a DWP mode relative to an SWP mode in the device can be used.

As has been described, the present disclosure presents a device that can be configured into either a DWP mode or an SWP mode. As the DWP mode supports voltage signaling on two separate wires, the DWP mode can provide a low-power mode relative to the SWP mode. This low-power DWP mode can support higher transmission rates. Moreover, this low-power mode can be advantageous in supporting application scenarios where the device incorporating the NFC and SE is not actively powered.

While the above description has focused on a particular application of DWP to communication between an SE and NFC, such an application is not intended to be limiting. DWP can be applied to communication between other chips that can benefit from two-wire voltage signaling.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A device, comprising:
    a first single wire protocol physical layer device that is configured to communicate bi-directionally with a second single wire protocol physical layer device via a single wire, wherein communication in a first direction over the single wire is via a voltage signal and communication in a second direction over the single wire is via a current signal;
    a digital communication block that is configured to transmit and to receive communication signals; and
    a selector module that is configured to couple the first single wire protocol physical layer device to an interface pin of the device when the device operates in a first mode using a single wire protocol for detection by the first single wire protocol physical layer device of a current signal from a second device, and to couple the digital communication block to the interface pin of the device when the device operates in a second mode using a two wire protocol for detection by the digital communication block of a voltage signal from the second device.

2. The device of claim 1, wherein the selector module is a multiplexer.

3. The device of claim 1, wherein the second device is a Secure Element (SE) chip.

4. The device of claim 1, wherein the digital communication block includes a control element that is configured to determine whether to communicate in the first mode or the second mode.

5. The device of claim 4, wherein the control element is responsive to an input pin that is used to indicate the first mode or the second mode.

6. The device of claim 4, wherein the control element is responsive to an amount of current drawn by the second device.

7. A method, comprising:
- determining, by a digital communication block in a first device, whether to communicate with a second device using either a single wire protocol where communication in a first direction over a single wire is via a voltage signal and communication in a second direction over the single wire is via a current signal or a two wire protocol where communication over two wires is via voltage signals; and
- configuring a selector module within the first device based on the determination, wherein the selector module is configured to couple a single wire protocol physical layer device to an interface pin of the first device when the first device operates using the single wire protocol for communication by the single wire protocol physical layer device with a second device via a current signal, and the selector module is configured to couple the digital communication block to the interface pin of the first device when the first device operates using the two wire protocol for communication by the digital communication block with the second device via a voltage signal.

8. The method of claim 7, wherein the selector module is a multiplexer.

9. The method of claim 7, wherein the second device is a Secure Element (SE) chip.

10. The method of claim 7, wherein the second device is a Near Field Communication (NFC) chip.

11. The method of claim 7, wherein the determining comprises determining using an input pin that indicates the first mode or the second mode.

12. The method of claim 7, wherein the determining comprises determining using an amount of current drawn by the second device.

13. A secure element device, comprising:
- a first single wire protocol physical layer device that is configured to communicate bi-directionally with a second single wire protocol physical layer device via a single wire, wherein communication in a first direction over the single wire is via a voltage signal and communication in a second direction over the single wire is via a current signal;
- a digital communication block that is configured to transmit and to receive communication signals; and
- a selector module that is configured to couple the first single wire protocol physical layer device to an interface pin of the secure element device when the device operates in a first mode using a single wire protocol for transmission of a current signal to a second device, and to couple the digital communication block to the interface pin of the secure element device when the device operates in a second mode using a two wire protocol for transmission by the digital communication block of a voltage signal to the second device.

14. The secure element device of claim 13, wherein the selector module is a multiplexer.

15. The secure element device of claim 13, further comprising a second selector module that is configured to couple the digital communication block to a second interface pin of the device when the device operates in the second mode for receipt of a voltage signal from a second device, and to couple the digital communication block to the first single wire protocol physical layer device when the device operates in the second mode for receipt by the digital communication block of a voltage signal from the first single wire protocol physical layer device.

16. The secure element device of claim 13, wherein the first single wire protocol physical layer device is configured to communicate two different non-zero current signal levels to the second device, wherein one of the two different non-zero signal levels communicates whether the secure element device supports the second mode.

* * * * *